(12) United States Patent
Zoller, IV et al.

(10) Patent No.: US 11,563,647 B1
(45) Date of Patent: Jan. 24, 2023

(54) DEPLOYING SERVICES TO MULTIPLE PUBLIC CLOUD ENVIRONMENTS USING CLOUD-SPECIFIC ENCAPSULATED COMMUNICATION LOGIC

(71) Applicant: Dell Products L.P., Round Rock, TX (US)

(72) Inventors: Linwood W. Zoller, IV, Lexington, KY (US); Daniel E. Cummins, Hudson, NH (US); David Jensen, Dallas, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/719,683

(22) Filed: Apr. 13, 2022

(51) Int. Cl.
| | |
|---|---|
| *H04L 41/50* | (2022.01) |
| *H04L 41/40* | (2022.01) |
| *H04L 67/10* | (2022.01) |

(52) U.S. Cl.
CPC .............. *H04L 41/50* (2013.01); *H04L 41/40* (2022.05); *H04L 67/10* (2013.01)

(58) Field of Classification Search
None
See application file for complete search history.

(56) References Cited

U.S. PATENT DOCUMENTS

| | | | | |
|---|---|---|---|---|
| 9,754,303 | B1 * | 9/2017 | Jagtap ................ | G06Q 30/0603 |
| 9,882,829 | B2 * | 1/2018 | Maes .................... | G06F 9/5072 |
| 11,218,563 | B1 * | 1/2022 | Parvataneni ......... | H04W 64/00 |
| 11,310,304 | B1 * | 4/2022 | Iyer ......................... | H04L 67/34 |
| 2017/0244593 | A1 * | 8/2017 | Rangasamy ........... | H04L 67/02 |
| 2021/0144517 | A1 * | 5/2021 | Guim Bernat ........ | H04W 12/04 |

OTHER PUBLICATIONS

Hernandez, Francisco, "New vRealize Orchestrator Plug-In for vRealize Automation", https://blogs.vmware.com/management/2021/03/vro-vra-plugin.html; dated Mar. 26, 2021; downloaded on Apr. 6, 2022.

"VMware vRealize Orchestrator Plug-In for vRealize Automation", https://marketplace.cloud.vmware.com/services/details/vmware-vrealize-orchestrator-plug-in-for-vrealize-automation-1?slug=true; updated Mar. 29, 2021; downloaded on Apr. 6, 2022.

* cited by examiner

*Primary Examiner* — Quang N Nguyen
(74) *Attorney, Agent, or Firm* — Ryan, Mason & Lewis, LLP

(57) ABSTRACT

Techniques are provided for deploying services to multiple public clouds using cloud-specific encapsulated communication logic. One method comprises performing, in response to a request associated with a given public cloud of multiple public clouds having corresponding encapsulated communication logic for communicating with the respective public cloud: obtaining an image for the encapsulated communication logic for the given public cloud; instantiating an orchestration service for the given public cloud using the image for the encapsulated communication logic for the given public cloud, wherein the instantiated orchestration service for the given public cloud makes a connection to an endpoint of the given public cloud using the encapsulated communication logic for the given public cloud; and processing a request to create a service in the given public cloud using the instantiated orchestration service for the given public cloud as a connection gateway to the given public cloud.

20 Claims, 7 Drawing Sheets

400

1. USER LOGS INTO ORCHESTRATION ENGINE 220 AND NAVIGATES TO A CLOUD INTEGRATION SECTION

2. USER SELECTS A PUBLIC CLOUD SUPPORTED BY THE ORCHESTRATION ENGINE 220 AND WITH WHICH THE USER HAS AN ACCOUNT TO DEPLOY SERVICES

3. USER PROVIDES ACCOUNT CREDENTIALS FOR SELECTED PUBLIC CLOUD AND OPTIONALLY ANY DESIRED CONSTRAINTS, SUCH AS REGION, AVAILABILITY ZONE AND/OR SPECIFIC SERVICE CONSTRAINTS

4. ORCHESTRATION ENGINE 220 STORES ACCOUNT CREDENTIALS IN CREDENTIAL MANAGEMENT SYSTEM

5. IN RESPONSE TO A REQUEST ASSOCIATED WITH SELECTED PUBLIC CLOUD, ORCHESTRATION ENGINE 220 OBTAINS AND EXECUTES ENCAPSULATED LOGIC CONTAINER IMAGE 350 FOR SELECTED PUBLIC CLOUD TO INSTANTIATE PUBLIC CLOUD ORCHESTRATION MICROSERVICE 235 FOR SELECTED PUBLIC CLOUD

6. ORCHESTRATION ENGINE 220 PROVIDES ACCOUNT CREDENTIALS TO INSTANTIATED PUBLIC CLOUD ORCHESTRATION MICROSERVICE 235

7. INSTANTIATED PUBLIC CLOUD ORCHESTRATION MICROSERVICE 235 MAKES CONNECTION TO API ENDPOINT OF SELECTED PUBLIC CLOUD

8. ORCHESTRATION ENGINE 220 PROCESSES REQUEST(S) TO CREATE SERVICES IN SELECTED PUBLIC CLOUD USING PUBLIC CLOUD ORCHESTRATION MICROSERVICE 235 FOR SELECTED PUBLIC CLOUD AS (I) A CONNECTION GATEWAY TO SELECTED PUBLIC CLOUD AND (II) A SOFTWARE DEVELOPMENT KIT TO IMPLEMENT API CALLS TO SELECTED PUBLIC CLOUD

DEPLOYING SERVICES TO MULTIPLE PUBLIC CLOUD ENVIRONMENTS USING CLOUD-SPECIFIC ENCAPSULATED COMMUNICATION LOGIC

FIELD

The field relates generally to information processing, and more particularly to deploying services in information processing systems.

BACKGROUND

Information processing systems increasingly utilize virtual resources to meet changing user needs in an efficient, flexible and cost-effective manner. For example, cloud computing systems implemented using virtual resources such as virtual machines and containers have been widely adopted. Such virtual resources may be used to provide at least a portion of the virtualization infrastructure of a given cloud-based information processing system. However, significant challenges can arise in the deployment of services in cloud-based information processing systems.

SUMMARY

Illustrative embodiments of the present disclosure provide techniques for deploying services to multiple public cloud environments using cloud-specific encapsulated communication logic.

In one embodiment, a method comprises performing the following steps in response to a request associated with a given public cloud of a plurality of public clouds, wherein each of the plurality of public clouds has corresponding encapsulated communication logic for communicating with the respective public cloud: obtaining an image for the encapsulated communication logic for the given public cloud; instantiating an orchestration service for the given public cloud using the image for the encapsulated communication logic for the given public cloud, wherein the instantiated orchestration service for the given public cloud makes a connection to an endpoint of the given public cloud using the encapsulated communication logic for the given public cloud; and processing one or more requests to create at least one service in the given public cloud using the instantiated orchestration service for the given public cloud as a connection gateway to the given public cloud.

In some embodiments, the encapsulated communication logic for the given public cloud is specific to the given public cloud and an update specific to the given public cloud can be processed by updating only the encapsulated communication logic for the given public cloud. A new public cloud can be added to the plurality of public clouds by adding new encapsulated communication logic for the new public cloud.

In one or more embodiments, the encapsulated communication logic for the given public cloud comprises an encapsulated software development kit for the given public cloud to implement one or more application programming interface calls to the given public cloud.

These and other illustrative embodiments include, without limitation, methods, apparatus, networks, systems and processor-readable storage media.

BRIEF DESCRIPTION OF THE DRAWINGS

FIG. 4 illustrates exemplary pseudo code for a service deployment process that uses cloud-specific encapsulated communication logic in an illustrative embodiment;

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Orchestration systems, such as orchestration engines that manage and deploy applications to on-premises systems (such as host devices), often need to integrate with public cloud environments as part of the application deployment process. This integration is necessary to deploy components to such public clouds that represent portions of a larger application. For example, an e-commerce application may be comprised of two components, where one component should be deployed to an on-premises host device directly managed by the orchestration engine while the second component is deployed to a public cloud. Both components communicate with each other to bring about the result needed for a single e-commerce application to function properly.

In one or more embodiments, an orchestration engine comprises encapsulated logic that is specific to each public cloud provider that is supported by the orchestration engine. For example, a first container image may comprise encapsulated logic that is needed to communicate with and control only a first public cloud environment, such as an AWS (Amazon Web Services) cloud computing platform. A second container image may comprise encapsulated logic that is needed to communicate with and control only a second public cloud environment, such as a Microsoft Azure cloud computing platform.

When triggered, for example, by a user making a public cloud-specific request in a user interface of the orchestration engine, the container image for the particular public cloud will be dynamically executed and connected to the orchestration engine. Any subsequent requests by the user or a program to create services in the respective public cloud will be dynamically routed through the created component. In this manner, the created component serves as a connection gateway, secures the connection, and provides a software development kit (e.g., where user interface calls against the respective public cloud are made).

Figure 1:
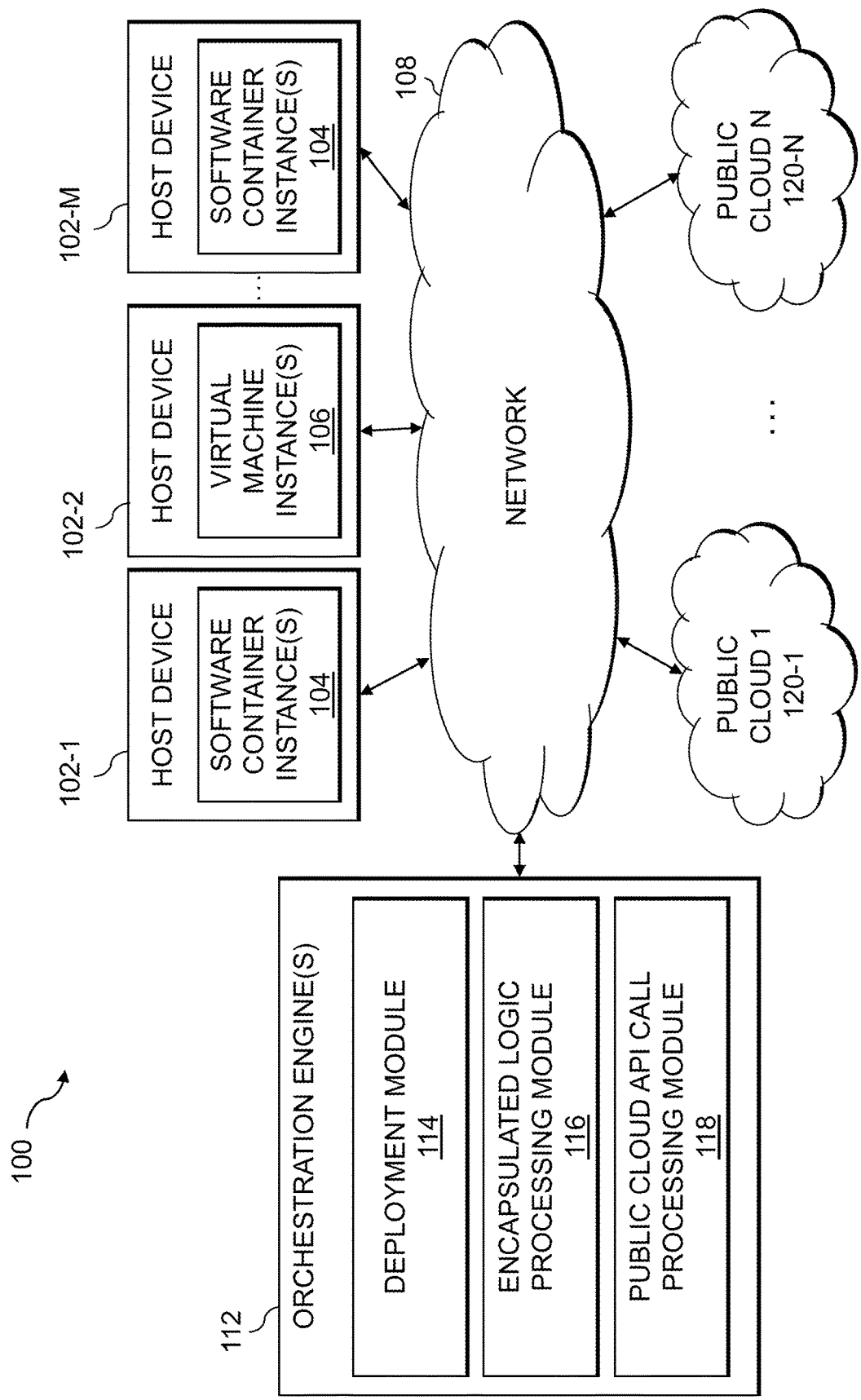
FIG. 1 is a block diagram of an information processing system for deploying services to multiple public cloud environments using cloud-specific encapsulated communication logic in an illustrative embodiment.

FIG. 1 shows an information processing system 100 configured in accordance with an illustrative embodiment to deploy services to multiple public cloud environments using cloud-specific encapsulated communication logic. The information processing system 100 comprises one or more host devices 102-1, 102-2, . . . 102-M (collectively, host devices 102) and an orchestration engine 112 that communicate over a network 108. The orchestration engine 112 may deploy one or more applications to one or more public clouds 120-1 through 120-N (collectively, public clouds 120). The public clouds 120 may comprise one or more cloud computing platforms, such as AWS, Microsoft Azure, Dell Technologies Cloud and/or Google Cloud.

The host devices 102 and orchestration engine 112 illustratively comprise respective computers, servers or other types of processing devices. For example, at least a subset of the host devices 102 may be implemented as edge endpoint computing devices or respective virtual machines of a compute services platform or other type of processing platform. The host devices 102 in such an arrangement illustratively provide compute services such as execution of one or more applications on behalf of each of one or more users associated with respective ones of the host devices 102. In an edge endpoint computing device implementation, for example, the edge endpoint computing device may comprise internal storage for storing data associated with one or more applications executing on the respective edge endpoint computing device. Thus, in at least some embodiments, the edge endpoint computing device does not need to consume storage from an external storage array.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be at least partially implemented outside of the cloud infrastructure context, as in the case of a stand-alone computing and storage system implemented within a given enterprise.

In the information processing system 100 of FIG. 1, software container instances 104 and/or virtual machine instances 106 run on the host devices 102.

In the FIG. 1 embodiment, the orchestration engine 112 further includes a deployment module 114, an encapsulated logic processing module 116 and a public cloud application programming interface (API) call processing module 118. The deployment module 114 is configured in some embodiments to deploy one or more software container instances 104 and/or virtual machine instances 106. The encapsulated logic processing module 116 may be configured to process encapsulated logic, discussed below in conjunction with FIG. 3. The public cloud API call processing module 118 processes API calls against one or more of the public clouds 120.

The orchestration engine 112 may be implemented, for example, using the Kubernetes container orchestration service, as modified herein to provide the features and functions of the present invention.

At least portions of the functionality of the deployment module 114, encapsulated logic processing module 116 and public cloud API call processing module 118 may be implemented at least in part in the form of software that is stored in memory and executed by a processor.

The host devices 102 and orchestration engine 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the orchestration engine 112 (or one or more components thereof such as the deployment module 114, encapsulated logic processing module 116 and/or public cloud API call processing module 118) may be implemented on respective distinct processing platforms, although numerous other arrangements are possible. For example, in some embodiments at least portions of one or more of the host devices 102 and the orchestration engine 112 are implemented on the same processing platform. The orchestration engine 112 can therefore be implemented at least in part within at least one processing platform that implements at least a subset of the host devices 102.

The network 108 may be implemented using multiple networks of different types to interconnect storage system components. For example, the network 108 may comprise a portion of a global computer network such as the Internet, although other types of networks can be employed, including a wide area network (WAN), a local area network (LAN), a satellite network, a telephone or cable network, a cellular network, a wireless network such as a WiFi or WiMAX network, or various portions or combinations of these and other types of networks. The network 108 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The orchestration engine 112 may be implemented at least in part in the first geographic location, the second geographic location, and one or more other geographic locations. Thus, it is possible in some implementations of the system 100 for different ones of the host devices 102 and the orchestration engine 112 to reside in different data centers.

Numerous other distributed implementations of the host devices 102 and/or the orchestration engine 112 are possible. Accordingly, the host devices 102 and/or the orchestration engine 112 can also be implemented in a distributed manner across multiple data centers.

Additional examples of processing platforms utilized to implement portions of the system 100 in illustrative embodiments will be described in more detail below in conjunction with FIGS. 6 and 7.

It is to be understood that the particular set of elements shown in FIG. 1 for deploying services to multiple public cloud environments using cloud-specific encapsulated communication logic is presented by way of illustrative example only, and in other embodiments additional or alternative elements may be used. Thus, another embodiment may include additional or alternative systems, devices and other network entities, as well as different arrangements of modules and other components.

For example, the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

It is to be appreciated that these and other features of illustrative embodiments are presented by way of example only, and should not be construed as limiting in any way.

Figure 2:
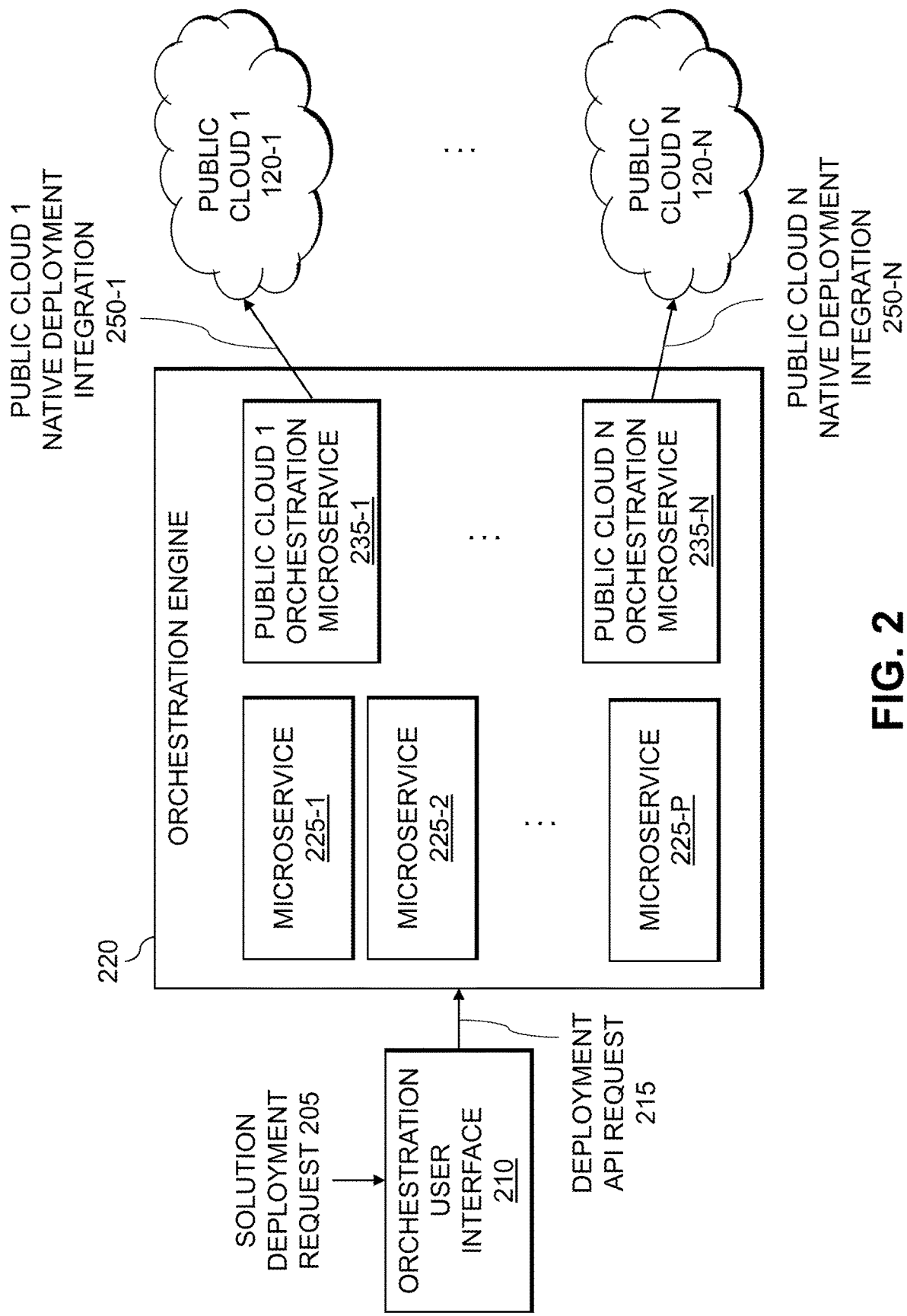
FIGS. 2 and 3 illustrate the orchestration engine of FIG. 1 in further detail in illustrative embodiments.

FIG. 2 illustrates the orchestration engine of FIG. 1 in further detail in an illustrative embodiment that executes one or more microservices 225-1 through 225-P. In the example of FIG. 2, a user submits a solution deployment request 205 associated with a given public cloud of the plurality of public clouds 120 using an orchestration user interface 210 of an orchestration engine 220. In response to the solution deployment request 205, the orchestration user interface 210 provides a deployment API request 215 to the orchestration engine 220. While the example of FIG. 2 employs a human user interacting with the orchestration engine 220 using the orchestration user interface 210 of the orchestration engine 220, the requests may also, or alternatively, be submitted using an API and/or a command line interface from a user or a user device.

The orchestration engine 220 will receive the deployment API request 215 associated with the given public cloud, and will then obtain and execute an encapsulated logic container image, as discussed further below in conjunction with FIG. 3, that is specific to the given public cloud. The cloud-specific encapsulated logic container image will be executed and connected to the orchestration engine 220, to instantiate a particular public cloud orchestration microservice 235 for the given public cloud of a plurality of available public cloud orchestration microservices 235-1 through 235-N. The instantiated particular public cloud orchestration microservice 235 will be provided with account credentials for the given public cloud. Each of the public cloud orchestration microservices 235-1 through 235-N is associated with a corresponding different one of the public clouds 120-1 through 120-N.

The public cloud orchestration microservice 235 is thus dynamically created, in at least some embodiments, when a user or process wishes to connect to the given public cloud. The public cloud orchestration microservice 235 comprises cloud-specific logic for connecting to the given public cloud and communicating with the given public cloud, and a software development kit that translates commands into a cloud-specific language that is specific to the given public cloud. Any subsequent requests by a user or program to create services in the given public cloud will be dynamically routed through the respective public cloud orchestration microservice 235 that serves as a connection gateway (e.g., in the form of a persistent connection from a service account), secures the connection, and a software development kit where API calls against the given public cloud are made.

In this manner, each of the public cloud orchestration microservices 235-1 through 235-N provides native deployment integration 250 to the respective public clouds 120-1 through 120-N.

Figure 3:
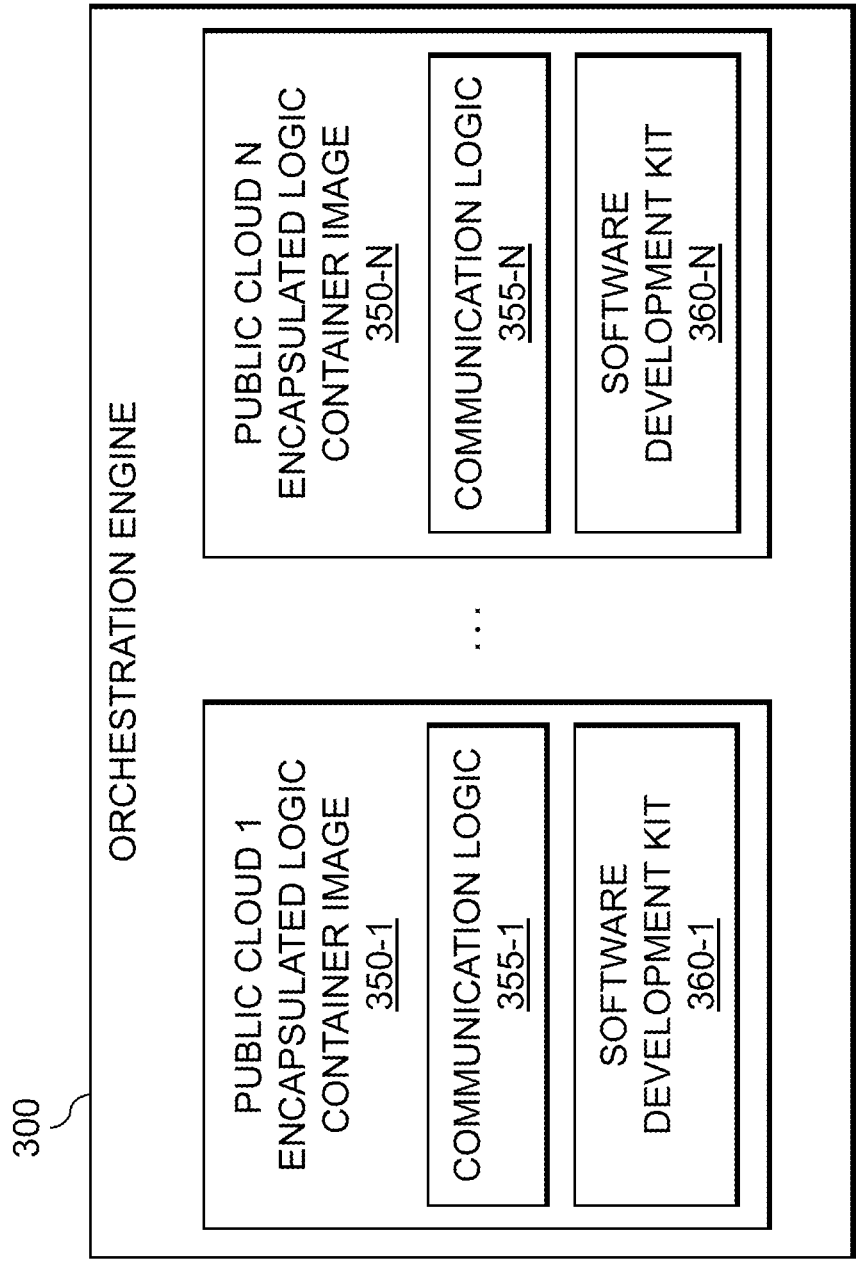

FIG. 3 illustrates the orchestration engine 112 of FIG. 1 in further detail in an illustrative embodiment. In the example of FIG. 3, an orchestration engine 300 comprises cloud-specific public cloud encapsulated logic container images 350-1 through 350-N for each of the respective public clouds 120-1 through 120-N. As shown in FIG. 3, the representative public cloud encapsulated logic container images 350-1 for public cloud 1 comprises communication logic 355-1 and a software development kit 360-1 for public cloud 1. Similarly, public cloud encapsulated logic container images 350-N for public cloud N comprises communication logic 355-N and a software development kit 360-N for public cloud N. In this manner, the public cloud encapsulated logic container images 350 comprise the logic that is needed to communicate with a given public cloud and to process API calls for the given public cloud. Generally, the orchestration engine 300 uses a common language that is translated by the respective software development kit 360 of a given public cloud into the appropriate cloud-specific language.

In one or more embodiments, at least some of the public cloud encapsulated logic container images 350 can be provided in orchestration engine 300 when the orchestration engine 300 is deployed, or they may be fetched automatically from an external location such as a public Open Container Initiative (OCI)-compliant container image registry. In addition, new and/or updated public cloud encapsulated logic container images 350 can be obtained, as needed, when an additional public cloud is added to the plurality of public clouds 120, or an existing public cloud encapsulated logic container image 350 is updated.

As used herein, the "image" shall be broadly construed to encompass container images and/or VM templates or images, as would be apparent to a person of ordinary skill in the art. Thus, while the public cloud encapsulated logic container images 350 in the example of FIG. 3 are instantiated in the form of containers, the public cloud encapsulated logic container images 350 may be implemented as templates and/or images of virtual machines, which would be instantiated as virtual machines outside of the context of the orchestration engine 300.

Exemplary processes for deploying services to multiple public cloud environments using cloud-specific encapsulated communication logic will now be described in more detail with reference to the pseudo code of FIG. 4 and the flow diagram of FIG. 5. It is to be understood that these particular processes are only examples, and that additional or alternative processes for deploying services to multiple public cloud environments using cloud-specific encapsulated communication logic may be used in other embodiments.

FIG. 4 illustrates exemplary pseudo code for a service deployment process 400 that uses cloud-specific encapsulated communication logic in an illustrative embodiment. In the example of FIG. 4, a user initially logs into the orchestration engine 220 in step 1 and navigates to a cloud integration section. The user then selects a public cloud 120 in step 2 supported by the orchestration engine 220 and with which the user has an account to deploy services. For example, if the user already has a relationship (and credentials) with Amazon Web Services, they would select an AWS cloud element from the available public clouds 120.

In step 3, the user provides account credentials for the selected public cloud and optionally any desired constraints, such as region, availability zone (e.g., one or more specific data centers) and/or specific service constraints. The account credentials may vary based on the cloud provider of the selected public cloud. The orchestration engine 220 then stores the account credentials for the selected public cloud in, for example, a credential management system in step 4.

In response to a request associated with the selected public cloud in step 5, the orchestration engine 220 obtains and executes the public cloud encapsulated logic container image 350 for the selected public cloud to instantiate the public cloud orchestration microservice 235 for the selected public cloud. The account credentials are provided by orchestration engine 220 to the newly instantiated public cloud orchestration microservice 235 in step 6 and the newly instantiated public cloud orchestration microservice 235 makes a connection to an API endpoint of the selected public cloud in step 7.

Request(s) to create services in the selected public cloud are processed by orchestration engine 220 in step 8 using the instantiated public cloud orchestration microservice 235 for the selected public cloud as (i) a connection gateway to the selected public cloud and (ii) a software development kit to implement API calls to the selected public cloud.

A user can define application definitions in the orchestration engine 300 that create services and/or components in the selected public cloud environment. For example, when a new application is defined in which an application component must be installed in the selected public cloud environment, the choices for that environment will be made available at this time.

In the event that the instantiated public cloud orchestration microservice 235 is removed at a later point in time, the container running this integration may be torn down and removed, to allow resources to be reclaimed by the orchestration system.

Figure 5:
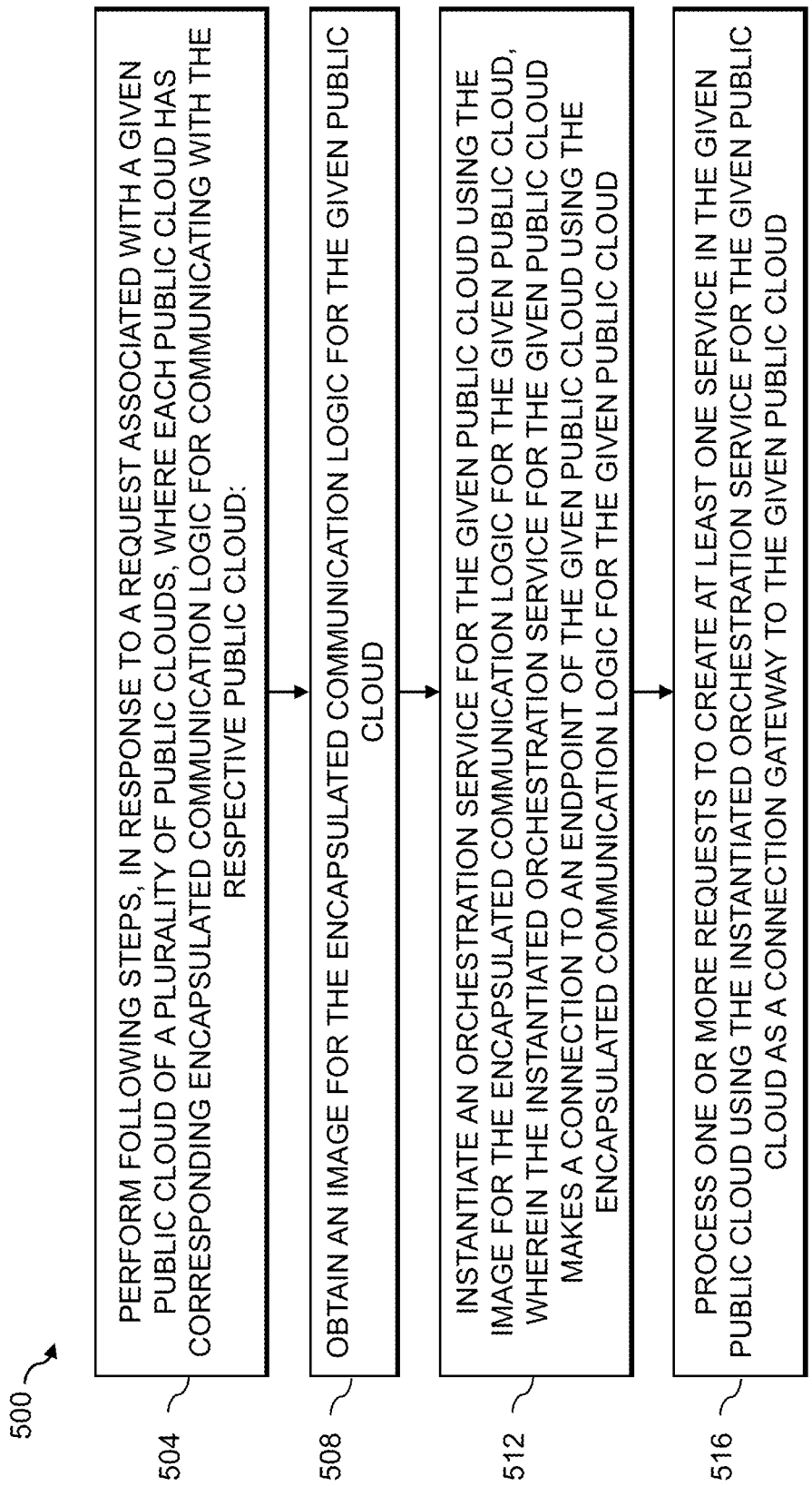
FIG. 5 is a flow diagram illustrating an exemplary implementation of a service deployment process that uses cloud-specific encapsulated communication logic in an illustrative embodiment.

FIG. 5 is a flow diagram illustrating an exemplary implementation of a service deployment process 500 that uses cloud-specific encapsulated communication logic in an illustrative embodiment.

In the embodiment of FIG. 5, the process 500 includes steps 504 through 516. These steps are assumed to be performed by the orchestration engine 112. The process begins at step 504, where a performance of steps 508-516 is initiated in response to a request associated with a given public cloud of a plurality of public clouds, wherein each of the plurality of public clouds has corresponding encapsulated communication logic for communicating with the respective public cloud.

In step 508, an image is obtained for the encapsulated communication logic for the given public cloud. In step 512, an orchestration service is instantiated for the given public cloud using the image for the encapsulated communication logic for the given public cloud, wherein the instantiated orchestration service for the given public cloud makes a connection (e.g., a secure connection) to an endpoint of the given public cloud using the encapsulated communication logic for the given public cloud.

One or more requests to create at least one service in the given public cloud are processed in step 516 using the instantiated orchestration service for the given public cloud as a connection gateway to the given public cloud.

In some embodiments, the encapsulated communication logic for the given public cloud is specific to the given public cloud, and an update specific to the given public cloud may be processed by updating only the encapsulated communication logic for the given public cloud. A new public cloud may be added to the plurality of public clouds by adding new encapsulated communication logic for the new public cloud. The encapsulated communication logic for the given public cloud may be updated in response to determining that an update is available for the encapsulated communication logic for the given public cloud.

In one or more embodiments, the encapsulated communication logic for the given public cloud may further comprise an encapsulated software development kit for the given public cloud to implement one or more application programming interface calls to the given public cloud.

The particular processing operations and other system functionality described in conjunction with the pseudo code and flow diagrams of FIGS. 4 and 5 are presented by way of illustrative example only, and should not be construed as limiting the scope of the disclosure in any way. Alternative embodiments can use other types of processing operations for deploying services to multiple public cloud environments using cloud-specific encapsulated communication logic. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different selective storage drive powering processes for respective different storage nodes 105 of an information processing system.

Advantageously, the service deployment techniques described herein reduce the complexity for connecting to public clouds relative to existing automation products and allow faster feature velocity, easier development, reduced resource consumption, and minimized attack surfaces.

In some embodiments, the cloud-specific container images comprising the respective encapsulated logic for the corresponding public cloud may be horizontally scaled for increased and decreased load depending on the number of objects being managed. By isolating cloud-specific logic, updates may be made on a per-cloud basis without impacting the cloud-specific logic of other cloud providers. Further, by decoupling the logic, additional cloud providers may be added with minimal impact on the overall control plane.

Among other benefits, multiple cloud providers may exist concurrently with a common method of interaction from the control plane and future development may occur in an out-of-band fashion. Additionally, the disclosed orchestration engine can check for newer versions of the cloud-specific integration logic (e.g., periodically) and automatically update the impacted cloud-specific container images.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for deploying services to multiple public cloud environments using cloud-specific encapsulated communication logic will now be described in greater detail with reference to FIGS. 6 and 7. Although described in the context of system 100, these platforms may also be used to implement at least portions of other information processing systems in other embodiments.

Figure 6:
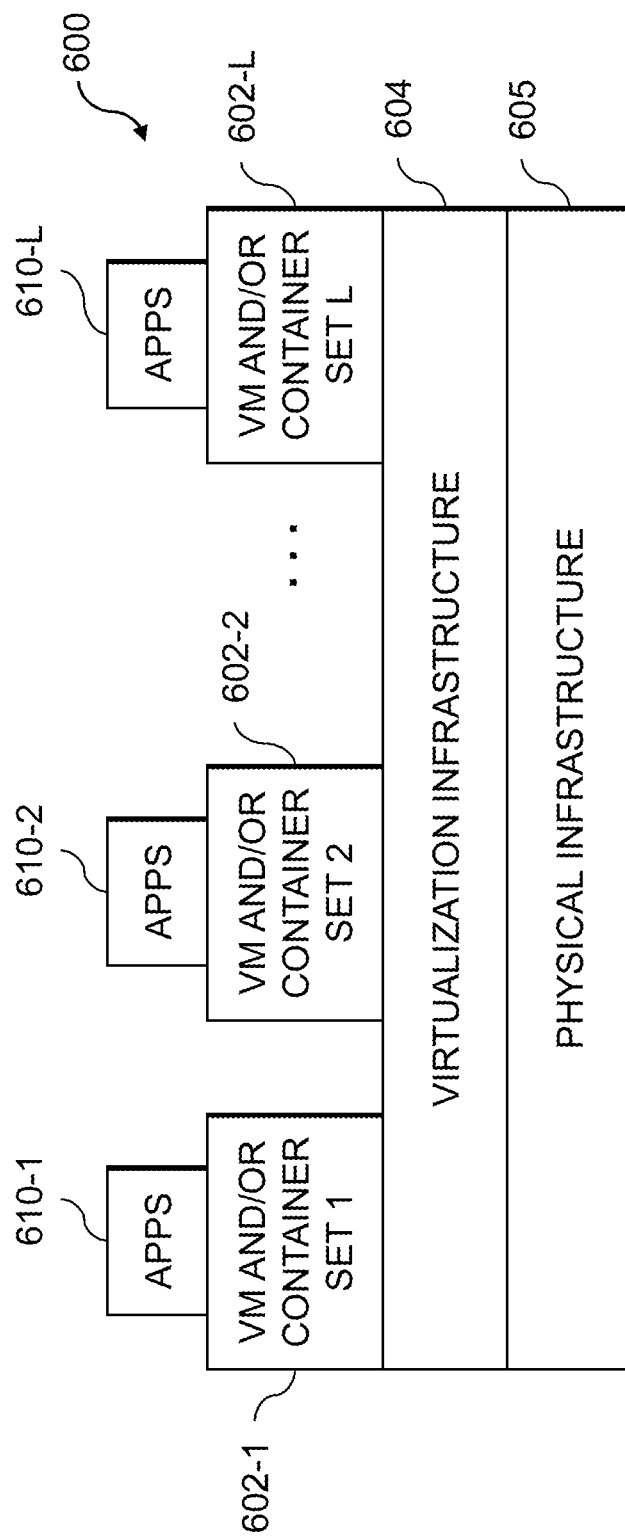
FIGS. 6 and 7 show examples of processing platforms that may be utilized to implement at least a portion of an information processing system in illustrative embodiments.
Figure 7:
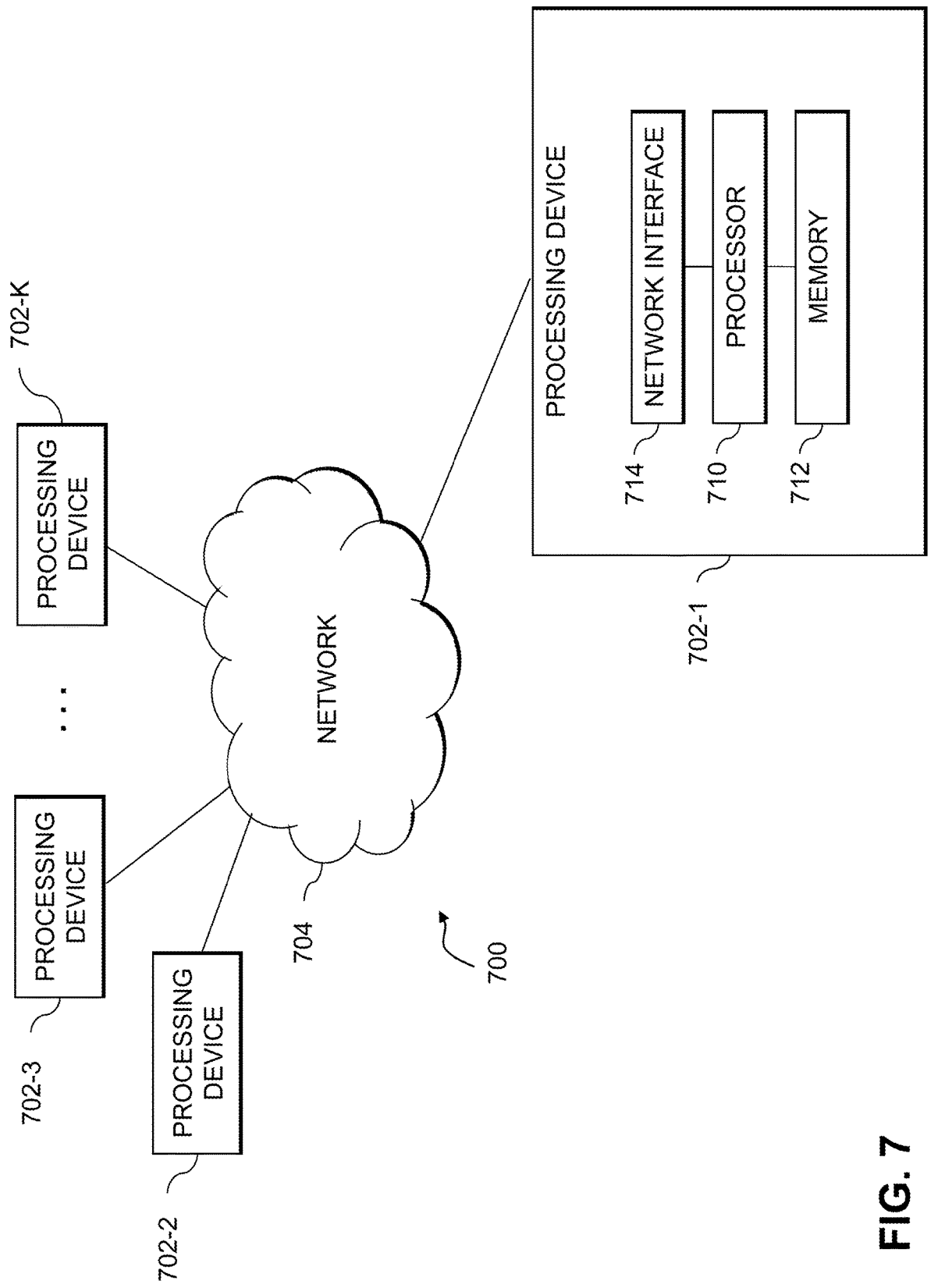

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple VMs and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for deploying services to multiple public cloud environments using cloud-specific encapsulated communication logic as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, container orchestrators, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
performing the followings steps, in response to a request associated with a given public cloud of a plurality of public clouds, wherein each of the plurality of public clouds has corresponding encapsulated communication logic for communicating with the respective public cloud:
obtaining an image for the encapsulated communication logic for the given public cloud;
instantiating an orchestration service for the given public cloud using the image for the encapsulated communication logic for the given public cloud, wherein the instantiated orchestration service for the given public cloud makes a connection to an endpoint of the given public cloud using the encapsulated communication logic for the given public cloud; and
processing one or more requests to create at least one service in the given public cloud using the instantiated orchestration service for the given public cloud as a connection gateway to the given public cloud;
wherein the method is performed by at least one processing device comprising a processor coupled to a memory.

2. The method of claim 1, further comprising obtaining account credentials for the given public cloud.

3. The method of claim 1, wherein the encapsulated communication logic for the given public cloud is specific to the given public cloud.

4. The method of claim 3, further comprising processing an update specific to the given public cloud by updating only the encapsulated communication logic for the given public cloud.

5. The method of claim 1, wherein the connection made by the instantiated orchestration service for the given public cloud comprises a secure connection to the endpoint of the given public cloud.

6. The method of claim 1, wherein the endpoint of the given public cloud comprises an application programming interface endpoint.

7. The method of claim 1, wherein the encapsulated communication logic for the given public cloud comprises an encapsulated software development kit for the given public cloud to implement one or more application programming interface calls to the given public cloud.

8. The method of claim 1, further comprising adding a new public cloud to the plurality of public clouds by adding new encapsulated communication logic for the new public cloud.

9. The method of claim 1, further comprising updating the encapsulated communication logic for the given public cloud in response to determining that an update is available for the encapsulated communication logic for the given public cloud.

10. The method of claim 1, wherein the encapsulated communication logic is part of one or more of a container and a virtual machine.

11. An apparatus comprising:
at least one processing device comprising a processor coupled to a memory;
the at least one processing device being configured to implement the following steps:
performing the followings steps, in response to a request associated with a given public cloud of a plurality of public clouds, wherein each of the plurality of public clouds has corresponding encapsulated communication logic for communicating with the respective public cloud:
obtaining an image for the encapsulated communication logic for the given public cloud;
instantiating an orchestration service for the given public cloud using the image for the encapsulated communication logic for the given public cloud, wherein the instantiated orchestration service for the given public cloud makes a connection to an endpoint of the given public cloud using the encapsulated communication logic for the given public cloud; and
processing one or more requests to create at least one service in the given public cloud using the instantiated orchestration service for the given public cloud as a connection gateway to the given public cloud.

12. The apparatus of claim 11, wherein the encapsulated communication logic for the given public cloud is specific to the given public cloud.

13. The apparatus of claim 12, further comprising processing an update specific to the given public cloud by updating only the encapsulated communication logic for the given public cloud.

14. The apparatus of claim 11, wherein the encapsulated communication logic for the given public cloud comprises an encapsulated software development kit for the given public cloud to implement one or more application programming interface calls to the given public cloud.

15. The apparatus of claim 11, further comprising adding a new public cloud to the plurality of public clouds by adding new encapsulated communication logic for the new public cloud.

16. A non-transitory processor-readable storage medium having stored therein program code of one or more software programs, wherein the program code when executed by at least one processing device causes the at least one processing device to perform the following steps:
performing the followings steps, in response to a request associated with a given public cloud of a plurality of public clouds, wherein each of the plurality of public clouds has corresponding encapsulated communication logic for communicating with the respective public cloud:
obtaining an image for the encapsulated communication logic for the given public cloud;
instantiating an orchestration service for the given public cloud using the image for the encapsulated communication logic for the given public cloud, wherein the instantiated orchestration service for the given public cloud makes a connection to an endpoint of the given public cloud using the encapsulated communication logic for the given public cloud; and
processing one or more requests to create at least one service in the given public cloud using the instantiated orchestration service for the given public cloud as a connection gateway to the given public cloud.

17. The non-transitory processor-readable storage medium of claim 16, wherein the encapsulated communication logic for the given public cloud is specific to the given public cloud.

18. The non-transitory processor-readable storage medium of claim 17, further comprising processing an update specific to the given public cloud by updating only the encapsulated communication logic for the given public cloud.

19. The non-transitory processor-readable storage medium of claim 16, wherein the encapsulated communication logic for the given public cloud comprises an encapsulated software development kit for the given public cloud to implement one or more application programming interface calls to the given public cloud.

20. The non-transitory processor-readable storage medium of claim 16, further comprising adding a new public cloud to the plurality of public clouds by adding new encapsulated communication logic for the new public cloud.

\* \* \* \* \*